United States Patent [19]

Chiang

[11] 4,401,742

[45] Aug. 30, 1983

[54] PREPARATION OF POSITIVE TONERS BY ACID TREATMENT

[75] Inventor: Albert C. Chiang, Danbury, Conn.

[73] Assignee: Pitney Bowes Inc., Stamford, Conn.

[21] Appl. No.: 360,135

[22] Filed: Mar. 22, 1982

[51] Int. Cl.³ .......................... G03G 9/08; C08J 3/20

[52] U.S. Cl. .......................... 430/137

[58] Field of Search .................. 524/803, 503; 430/137

[56] References Cited

U.S. PATENT DOCUMENTS 4,077,804 3/1978 Vawzo .......................... 430/137

4,107,126 8/1978 Burke .......................... 524/803

*Primary Examiner*—John E. Kittle

*Assistant Examiner*—John L. Goodrow

*Attorney, Agent, or Firm*—Melvin J. Scolnick; Albert W. Scribner; William D. Soltow, Jr.

[57] ABSTRACT

A method for the preparation of toners that exhibit relatively low conductivity ($10^{-9}$ to $10^{-14}$ $ohm^{-1}$ $cm^{-1}$) and positive triboelectrical properties (5.0–30μ c/g) is disclosed. The process steps include first forming a homogeneous dispersion of both carbon black particles and particles of a second pigment saturated with monomer and initiator by intimately mixing at least one monomer, carbon black, particles of the second pigment, and a polymerization initiator and adding the mixture to a mixture of sufficient water and at least one alcoholic dispersing agent to form a homogeneous dispersion solution. The solution is then heated to a temperature sufficient to substantially complete the polymerization of the monomer and form a homogeneous polymeric dispersion of the carbon black particles and the particles of the second pigment. Thereafter a weak organic acid (PKa 3.0–6.0) or a weak acid anhydride (PKa 3.0–6.0) is added to the polymeric dispersion in an amount sufficient to substantially complete the esterification of the alcoholic dispersing agent and the toner particles are then recovered.

9 Claims, No Drawings

PREPARATION OF POSITIVE TONERS BY ACID TREATMENT

BACKGROUND OF THE DISCLOSURE

1. Field of the Invention

This invention relates to a method for the preparation of a toner material as used in a xerographic type apparatus, and more particularily, to an improved method for manufacturing toner material for use in dual component toners by a process utilizing an acid treatment of a polymeric dispersion of pigment particles.

2. Description of the Prior Art

The forming and developing of images on the surface of certain photoconductive materials by electrostatic means is now well known. Carlson, in U.S. Pat. No. 2,297,692 teaches the basic xerographic process which involves charging a photoconductive insulating layer and then exposing the layer to a light-and-shadow image which dissipates the charge on the portions of the layer which are exposed to light. The electrostatic latent image formed on the layer corresponds to the configuration of the light-and-shadow image. In another modification, a latent electrostatic image is formed on the photoconductive insulating layer by charging the layer in image configuration. A finely divided developing material comprising a colorant and called a toner is deposited on the image layer. The developing material is normally attracted to those portions of the layer which retain a charge, thereby forming a powder image corresponding to the latent electrostatic image. The powder image may then be transferred to paper or any other receiving surface. The powder image is permanently bonded to the paper by any suitable fixing means. Typically, a heating process called thermal fusing is used. For example, see the fusing processes described in U.S. Pat. Nos. 2,357,809, 2,891,011 and 3,079,342.

Over the years, many different types of toner materials have been developed for use in the various types of development methods typically employed in xerographic machines, e.g. magnetic brush development, cascade development, etc. Typically, these toners comprise various resin materials, e.g. resin materials such as styrene polymers and copolymers, that are mixed with different pigments, e.g. carbon black, to obtain a toner that is stable, have the correct triboelectric properties for proper developing in a xerographic process, have certain melting point characteristics for heat fusing, etc. Generally speaking, these toners are prepared by thoroughly mixing in a mill the resin and pigment materials (with other additives) to obtain a uniform dispersion, and then pulverizing the blended dispersion to form small particles (about 5 to 10 microns) of the material. This technique does, however, present certain disadvantages. For example, it is generally difficult to control particle size and shape within the desired range. The process itself is not an efficient one and therefore tends to increase the cost of the toner. Furthermore, and perhaps of the greater importance, is the fact that it is difficult to control the electrical properties of the final toner product which, of course, will effect copy quality to a substantial degree. If, for example, the pigment particles are not well coated with the resin, the final toner product will tend to be too conductive and will not take on a sufficient triboelectric charge. When such a toner product is used in a xerographic apparatus, either no developed image will be obtained or the image will be very light, and therefore of rather poor quality.

Various attempts have been made to overcome some of the above described problems. For example, U.S. Pat. No. 4,071,670 describes a process for the formation of polymeric particles (for subsequent use in electrostatic powder coating) of a size variation within the range of 5 to 25 microns by a suspension polymerization process. Specifically, the particles are formed by mixing a monomer in an aqueous solution of water and a stabilization agent, subjecting the mixture to high shear agitation, polymerizing the monomer and then recovering the polymeric particles. U.S. Pat. No. 4,077,804 describes a method of producing toner particles by an in-situ polymerization process. Chemical Abstracts, Physical and Analytical Chemistry Sections, Vol. 88, No. 11, Abstract No. 161466P describes toners prepared by a process involving direct polymerization of a pigmented monomer. The inhibition of polymerization of the monomer by the pigment is eliminated by coating the pigment with a reactive silane. However, not all of these procedures are successful in eliminating the disadvantages described hereinabove, and in some cases, the processes described introduce other problems. For example, in some instances the yield of toner product is rather poor. In addition, there is sometimes a tendency for the toner particles to agglomerate.

It is also known to prepare toners by polymerization techniques where large amounts of surfactants are needed in order to provide a stable dispersion. Typically, large organic molecule type surfactants are combined with either strong acid salts, such as phosphates, sulfates, or electron donating type groups such as polyvinyl alcohol and amine. The strong acid salts tend to largely increase the electrical conductivity of the toner particles, while the electron donating groups, such as polyvinyl alcohol, tend to promote unfavorable triboelectric charge properties.

SUMMARY OF THE INVENTION

It is therefore an object of the present invention to overcome many of the disadvantages of prior art processes for producing toner particles.

It is a further object of the present invention to provide a method which will produce stable toner particles by a polymerization technique.

It is a further object of the present invention to provide a method for producing toner particles which will exhibit low conductivity ($10^{-9}$ to $10^{-14}$ $ohm^{-1}$ $cm^{-1}$) and positive triboelectric charge properties (5.0-30 $\mu c/g$) when employed (with a carrier) as the dual component developing material in a xerographic copying apparatus such that excellent copies can be made.

It is a further object of the present invention to provide a method for producing relatively high yields of toner particles.

The foregoing objects and others are accomplished in accordance with the present invention by providing a method for the preparation of toners that exhibit relatively low conductivity and positive triboelectrical properties comprising the steps of first forming a homogeneous dispersion of both carbon black particles and particles of a second pigment saturated with monomer and initiator by (i) intimately mixing at least one monomer, carbon black, particles of the second pigment and a polymerization initiator and (ii) adding the mixture to a mixture of water and at least one alcoholic based dispersing agent to form a homogeneous dispersion solution. Thereafter the solution is heated to a temperature sufficient to substantially complete the polymerization of said monomer and form a homogeneous polymeric dispersion of the carbon black particles and the particles of the second pigment. A weak organic acid or an acid anhydride is then added to the polymeric dispersion in an amount sufficient to substantially complete the esterification of the alcoholic dispersing agent, and the toner particles are thereafter recovered.

DESCRIPTION OF THE PREFERRED EMBODIMENTS

Broadly stated, the process of this invention involves a method for the preparation of toner particles comprising the steps of first forming a homogeneous dispersion of both carbon black particles and particles of a second pigment saturated with monomer and initiator by intimately mixing at least one monomer, carbon black, a polymerization initiator and particles of a second pigment and then adding to the mixture a mixture of sufficient water and at least one alcoholic dispersion agent to form a homogeneous dispersion solution. In accordance with the present invention, forming a dispersion of pigment particles saturated with monomer and initiator means forming pigment particles having their surfaces totally absorbed with monomer and initiator. To be able to saturate the pigment particles it is critical, in accordance with the present invention, that the ingredients be intimately mixed together. This is preferably done by mixing the ingredients under high shear conditions in a mill such as, for example, a ball mill for a sufficient time to saturate the pigment particles with monomer and initiator.

In accordance with the present invention, the one or more monomers employed in the initial mix for preparing the toner can be selected from any of the known suitable organic monomers. The selection, of course, depends primarily on the type of toner that one desires to produce and particularly the type of properties that one desires the toner to exhibit when employed in a xerographic apparatus. Typical monomers that can be used are those having the general formula:

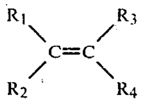

wherein $R_1$ and $R_2=H$ $R_3=H$ or $CH_3$ $R_4=COOR_5$; $COOCH_2OH$, CN, $C_6H_5$, $R_5=C_6H_5$ where $R_5$ has a carbon number of from 0–8.

Typical monomers useful in this invention are:

A. acrylic acid

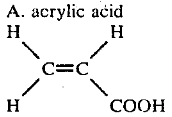

E. acryloamide

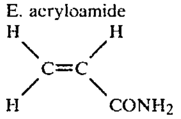

B. n-butyl acrylate

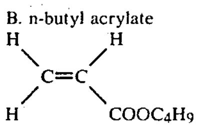

F. vinyl acetate

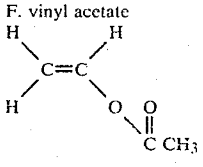

-continued

C. isobutyl acrylate

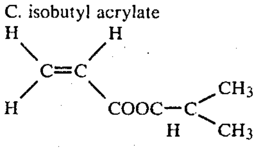

G. glycidyl methacrylate

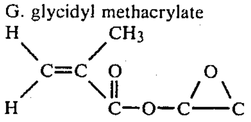

D. ethyl acrylate

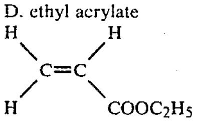

H. 2-hydroxyethyl acrylate

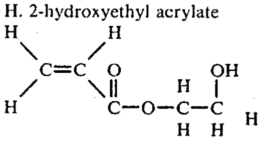

I. acrylonitrile

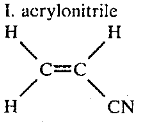

K. styrene

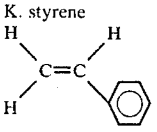

J. vinyl toluene

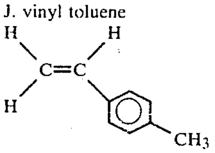

L. 2-methoxyethylacrylate

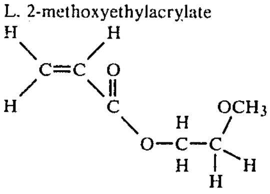

Other monomoners useful in this invention include 2-hydroethyl methacrylate, methacrylic acid, n-butyl methacrylic acid, isobutyl methacrylate, ethyl methacrylate, n-propyl acrylate, isopropyl acrylate, pentyl acrylate, n-propyl methacrylate, isopropyl methacrylate, pentyl methacrylate, stearyl methacrylate, lauryl methacrylate, lauryl acrylate, stearyl acrylate, isodecyl methacrylate, isodecyl acrylate, 3-hydropropyl methacrylate, 3-hydropropyl acrylate, t-butylaminoethyl methacrylate, t-butyaminoethyl acrylate, 2-ethylhexyl acrylate and mixtures thereof.

Any suitable vinyl monomer may be employed such as esters of saturated alcohols with mono and polybasic unsaturated acids, such as, alkyl acrylates and methacrylates, haloacrylates, diethyl maleate and mixtures thereof; vinyl and vinylidene halides such as vinyl chloride; vinyl fluoride, vinylidene fluoride, tetrafluoroethylene, chlorotrifluoroethylene and mixtures thereof; vinyl esters such as vinyl acetate, unsaturated aromatic coumpounds such as vinyl acetate, unsaturated aromatic compounds such as styrene and various alkyl styrenes, alphamethyl styrene parachlorostyrene, parabromostyrene, 2,4-dichlorostyrene, vinyl naphthalene, paramethoxystyrene and mixtures thereof; unsaturated amides such as acrylamide, methacrylamide and mixtures thereof; unsaturated nitriles such as acrylonitrile, methacrylonitrile, haloacrylonitrile, phenylacrylonitrile, vinylidene cyanide, and mixtures thereof; N-substituted unsaturated amides such as N, N dimethyl acrylamide, N-methyl acrylamide, and mixtures thereof; conjugated butadienes such as butadiene, isoprene and mixtures thereof; unsaturated ethers such as divinyl ether, diallyl ether, vinyl alkyl ether and mixtures thereof; unsaturated ketones such as divinyl ketone, vinyl alkyl ketone and mixtures thereof; unsaturated aldehydes and acetals such as acrolein and its acetals, methacrolein and its acetals, and mixtures thereof; unsaturated heterocyclic compounds such as vinyl pyridine, vinyl furan, vinyl coumarone, N-vinyl carbazole, and mixtures thereof; unsaturated alicyclic compounds such as vinyl-cyclopentane, vinyl-cyclohexane and mixtures thereof; unsaturated thio compounds such as vinyl thio-ethers; unsaturated hydrocarbons such as ethylene, propylene, coumarone, indene, terpene, polymerizable hydrocarbon fractions, isobutylene and mixtures thereof; allyl compounds such as allyl alcohol, allyl esters, diallyl phthalate, triallycyanurate and mixtures thereof. Any suitable mixture of copolymerizable monomers of the type described above can also be used in accordance with the method of this invention. Generally, the amount of monomer added can range from about 50 to about 90 (preferably from about 65 to about 90) weight percent based upon the entire dry weight of the final toner product.

In addition to the use of carbon black, a second pigment is used to produce toner particles in accordance with the method of the present invention. The second pigment is added to (i) maintain the proper color of the toner product, i.e. control the tone of the black color and (ii) act as a charge modifier, i.e. improve or promote the positive charge. Any of numerous suitable pigment materials may be used in the method of this invention together with the carbon black particles to form colored particles. Generally, what is desired is that the pigment be substantially insoluble in water, capable of being dispersed and saturated in a monomer and give strong and permanent colors when used in a toner. Generally, the total amount of pigment (carbon black+second pigment) added can range from about 2 to about 15 (preferably from about 5 to about 10) weight percent based upon the total dry weight of the final toner product. Furthermore, it should be noted that the ratio of carbon black to second pigment should preferably lie in the range of from about 10:1 to about 10:6.

Examples of the types of pigment that can be used as the second pigment are spirit nigrosine, organic pigments derived from triaryl methane dyestuffs, organic pigments derived from anthraquinone, phthalocyanines, lithois, toluidene and inorganic pigment such as $TiO_2$. Typical of phtalocyanine pigments are copper phthalocyanine, mono-chloro copper phthalocyanine, hexadecachloro copper phthalocyanine, metal-free phthalocyanine, mono-chloro metal-free phthalocyanine, and hexadecachloro metal-free phthalocyanines; examples of the anthraquinone vat pigments that can be used include vat yell 6 CL 1127, quinone yellow 18-1, indanthrone CL 1106, pyranthrone CL 1096; brominated pyranthrones such as: dibromopyranthrone, vat brilliant orange RK, anthrimide brown CL 1151, dibenzanthrone green CL 1101, flavanthrone yellow CL 1118; thioindigo pigments such as: thioindigo red and pink FF; azo pigments such as toluidine red CL 69 and hansa yellow; and metalized pigments such as azo yellow (green gold) and permanent red. The carbon black may be any of the known types such as channel black or furnace black. Additionally, combinations of pigments and dyes can be employed as the second pigment to obtain specific coloration effects.

In forming a dispersion of pigment particles saturated with monomer, there is added to the mix for the purpose of starting the polymerization process, a polymerization initiator. In accordance with the present invention, any suitable polymerization initiator can be used, although the water insoluble initiators are preferred. Examples of those initiators which can be used include azobisisobutyronitrile (AIBN), benzoyl peroxide, methylethyl ketone peroxide, isopropyl peroxy carbonate cumene hydroperoxide, 2,4-dichloro benzoyl peroxide, lauroyl peroxide, N-nitrosoacylanilide, P-bromobenzenediazohydroxide, triphenylazobenzene, n-butyl hydroperoxide, per benzoic acid, ditertiarybutyl peroxide, t-butylperbenzoate and the like. Generally, from about 0.5 to about 5 weight percent, and more preferably from about 1 to about 3 weight percent, of the initiator is used based upon the total dry weight of the final toner product. To prevent the polymerization initiator from starting the polymerization process while the intimate mix is being prepared, it is preferred that the ingredients within the mix be kept at a temperature below about 30° C. during mixing. This can be accomplished in numerous ways, such as, for example, by circulating a cold liquid about the container within which the mixing is being performed.

It is preferred that a dispersing aid (emulsifier) also be used in the process of the present invention. In accordance with the present invention, any suitable alcoholic based emulsifier may be used as the dispersing agent. Examples of the type of typical alcoholic emulsifiers that can be used include Triton X-305, Triton X-405, Triton CF-32 and polyvinyl alcohol. Triton is a registered trademark of Rohm and Haas Company. Tritons are surface active agents generally described as nonionic alkylphenyl polyether alcohols. They have the general formula:

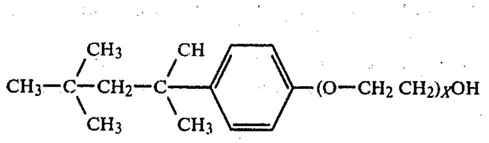

wherein X=1 to 70.

In Triton X-305, X is equal to 30 Triton X-405, X is equal to 40

Generally, from about 5 to about 20 weight percent, and more preferably from about 8 to about 15 weight percent of an alcoholic dispersing agent based upon the dry weight of the final toner product is sufficient.

In accordance with the present invention, a homogeneous dispersion of the carbon black and pigment particles coated with monomer is prepared by mixing the dispersion of pigment particles saturated with monomer as described above, (the mix including a polymerization initiator) with a mixture of water and at least one dispersing agent using rapid agitation. The polymerization reaction, and therefore the formation of a homogeneous polymeric dispersion of the carbon black particles and the particles of the second pigment is brought to substantial completion by preferably applying heat to the aqueous solution of pigment, monomer, initiator and dispersion agent. When heat is applied to the aqueous solution, polymerization is accelerated by forming more free radicals from the initiator. Generally, the reaction temperatures are adjusted to the range of about 50° C. to about 95° C. The solution is preferably heated within this range of temperature for a time ranging from about three (3) to about eight (8) hours. Other ways which could be used to help start-up the polymerization reaction in accordance with the present invention would be to apply ultra-violet radiation to the aqueous solution, or apply a high voltage electrical field.

In accordance with the present invention, the toner particles are then esterified, i.e., the alcoholic dispersion agent is transferred to an ester form, for the purpose of increasing the positive triboelectrical properties of the toner particles by the reaction of the hydroxyl group of alcoholic based dispersing agent and a weak organic acid or acid anhydride. This is preferably accomplished by adding a weak organic acid (ionization constant Pka about 3 to 6) or acid anhydride (ionization constant Pka about 3 to 6) to the homogeneous polymeric dispersion of carbon black particles and particles of the second pigment. Typically the weak organic acids that can be used in accordance with the present invention have the general formula:

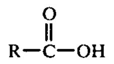

where R=$C_1$-$C_{20}$ or R=

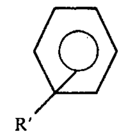

where R'=$CH_3$, $NO_2$, Cl or H.
Examples of some of the weak organic acids which can be used include acetic acid, formic acid, propionic acid, butyric acid, valeric acid, caproic acid, lauric acid, myristic acid, palmitic acid, benzoic acid, nitrobenzoic acid and steoric acid.

Typically, the acid anhydrides that can be used in accordance with the present invention have the general formula:

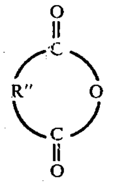

where R''=$C_1$-$C_{20}$ or R''=

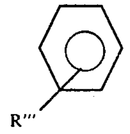

where R'''=$CH_3$ or H.
Examples of some of the acid anhydrides are succinic anhydride, acetic anhydride, maleic anhydride, phthalic anhydride and polymaleic anhydride.

In accordance with the present invention, the amount of weak organic acid or acid anhydride added for esterification should be preferably equal to or slightly excess (up to about 5%) the chemical equivalent of the alcoholic dispersing agent(s) added in the process.

After the esterification procedure, the toner product is recovered. This can be accomplished by a spray drying operation to form the toner. Details of the spray drying procedure itself are familiar to those skilled in the art. It suffices to say that during the spray drying steps various types of resins can be added to modify such toner properties as the triboelectric characteristics, fusing characteristics and adhesiveness, and also chemical modifiers can be added to, for example, modify the fusing characteristics. Alternatively, the toner product can be obtained from the esterified dispersion by precipitating the toner from the dispersion, filtrating the toner product, drying the filtered toner product, mechanically grounding the dried toner and then classifying the material to obtain the proper particle size distribution, e.g. toner particle sizes ranging between about 1 micron to about 30 microns.

The present invention will be described in details with reference to the following examples for illustrative purposes.

EXAMPLE I

A 150 g monomer mixture was obtained by mixing 20 g of methyl methacrylate, 80 g of butyl methacrylate and 50 g of styrene in a two liter stainless steel container. Then 20 g of carbon black 400R, 3 g of nigrosine and 6 g of azo isobutylnitrile (AIBN) were added into the 150 g monomer mixture. This mixture was then stirred for ten (10) minutes with a high speed mixer. Thereafter, 500 g of a 0.5% aqueous polyvinyl alcohol and the monomer/carbon black/pigment/initiator dispersion were mixed and stirred for 30 minutes in a three liter resin kettle. 650 g of 5% aqueous polyvinyl alcohol was then added into the resin kettle. The polymerization was completed by keeping the mixture at 70° C. for six hours under a nitrogen atmosphere. After this, 120 ml of a solution of 40% acetic acid was slowly added into the resin kettle at 80° C. Excess water was also added to initiate the precipitation after one hour of the esterification reaction. The resulting precipitate was then filtrated, dried and mechanically ground. Following sieving and classifying, the toner had a particle size distribution in the range of 1$\mu$ to 30$\mu$. The resulting toner product exhibited a relatively high positive triboelectrical charge acceptance.

EXAMPLE II

A 300 g monomer mixture was prepared by mixing 90 g of butyl acrylate and 210 g of styrene in a one liter erlenmeyer flask. 30 g of carbon black 400R, 9 g of benzoyl peroxide, 3 g nigrosine and 300 g of the monomer mixture were mixed in a two liter stainless steel beaker using a high speed mixer. Thereafter, 500 g of 0.5% polyvinyl alcohol aqueous solution and 342 g of the monomer/carbon black/pigment/initiator dispersion were mixed in a three liter resin kettle and the mixture was stirred for thirty minutes. 700 g of a 6% aqueous polyvinyl alcohol solution was then added into the reaction mixture. The polymerization was completed by keeping the mixture at 75° C. for six hours under a nitrogen atmosphere. After this, 150 ml of a 40% acetic anhydride was added into the resin kettle while stirring. After one hour of esterification at 80° C., excess water was added to the mixture to initiate precipitation. The precipitation was then filtered, dried and mechanically ground. After sieving and classifying, particle sizes in the range of 1 to 30 microns were collected. The resulting toner product exhibited a relatively high positive triboelectricical charge acceptance.

I claim:

1. A method for the preparation of toner particles comprising the steps of:

(a) forming a homogeneous dispersion of both carbon black particles and particles of a second pigment saturated with monomer and initiator by (i) initimately mixing at least one monomer, carbon black, paricles of the second pigment and a polymerization initiator and (ii) adding the mixture to a mixture of sufficient water and at least one alcoholic dispersing agent to form a homogeneous dispersion solution;

(b) heating said solution to a temperature sufficient to substantially complete the polymerization of said monomer and form a homogeneous polymeric dispersion of said carbon black particles and the particles of said second pigment;

(c) adding to said polymeric dispersion a weak organic acid or a weak acid anhydride in an amount sufficient to substantially complete the esterification of said alcoholic dispersing agent; and (d) recovering the toner particles.

2. A method according to claim 1 wherein said organic acid is one having the formula

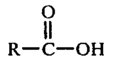

where R=$C_1$-$C_{20}$ or R=

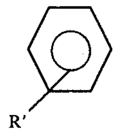

where R'=$CH_3$, $NO_2$, Cl or H.

3. A method according to claim 2 wherein said organic acid has an ionization constant (Pka) of about 3 to about 6.

4. A method according to claim 1 wherein said acid anhydride is one having the formula

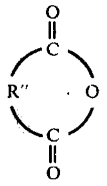

where R''=$C_1$-$C_{20}$ or R''=

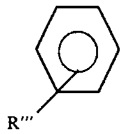

where R'''=$CH_3$ or H.

5. A method according to claim 4 wherein said acid anhydride has an ionization constant (Pka) of about 3 to about 6.

6. A method according to claim 2 or 4 wherein said solution is heated to a temperature ranging from about 50° C. to about 95° C.

7. A method according to claim 1 wherein said alcoholic based dispersing agent is polyvinyl alcohol.

8. A method according to claim 1 wherein step (d) comprises the steps of:

(i) precipitating toner particles from the solution formed in step (c);

(ii) drying the precipitated toner particles; and (iii) grinding the dried toner particles.

9. A method according to claim 1 wherein step (d) comprises spray drying the solution formed in step (c).

* * * * *